(12) United States Patent
Young et al.

(10) Patent No.: US 8,591,040 B2
(45) Date of Patent: Nov. 26, 2013

(54) PROJECTION DEVICE FOR ARCHITECTURAL AND ENTERTAINMENT LIGHTING

(75) Inventors: Garrett J. Young, Sully, IA (US); Andrew Stangeland, Oskaloosa, IA (US)

(73) Assignee: Prism Projection, Inc., Sully, IA (US)

( * ) Notice: Subject to any disclaimer, the term of this patent is extended or adjusted under 35 U.S.C. 154(b) by 330 days.

(21) Appl. No.: 12/945,150

(22) Filed: Nov. 12, 2010

(65) Prior Publication Data
US 2011/0116051 A1 May 19, 2011

Related U.S. Application Data

(60) Provisional application No. 61/261,069, filed on Nov. 13, 2009.

(51) Int. Cl.
*G03B 21/14* (2006.01)

(52) U.S. Cl.
USPC ............ 353/84; 353/31; 353/33; 362/84; 362/231

(58) Field of Classification Search
USPC ........ 353/31, 33, 34, 37, 94, 98, 99; 362/551, 362/553, 555, 559, 561, 227, 230, 231, 234, 362/84; 385/133, 901; 249/5, 7, 8, 9; 349/5, 349/7, 8, 9
See application file for complete search history.

(56) References Cited

U.S. PATENT DOCUMENTS

| | | | |
|---|---|---|---|
| 7,001,025 B2 * | 2/2006 | Engle | 353/94 |
| 7,168,810 B2 * | 1/2007 | Peterson et al. | 353/31 |
| 7,220,005 B2 * | 5/2007 | Yamasaki et al. | 353/31 |
| 7,261,453 B2 * | 8/2007 | Morejon et al. | 362/555 |
| 7,445,340 B2 * | 11/2008 | Conner et al. | 353/20 |
| 7,494,228 B2 * | 2/2009 | Harbers et al. | 353/94 |
| 7,567,384 B2 * | 7/2009 | Peterson | 359/618 |
| 7,775,669 B2 * | 8/2010 | Liao et al. | 353/94 |
| 7,832,878 B2 * | 11/2010 | Brukilacchio et al. | 353/99 |
| 7,859,554 B2 | 12/2010 | Young | |
| 2005/0128441 A1 | 6/2005 | Morgan | |

(Continued)

FOREIGN PATENT DOCUMENTS

| | | |
|---|---|---|
| EP | 1596247 | 11/2005 |
| EP | 1605199 | 12/2005 |

(Continued)

OTHER PUBLICATIONS

"International Application Serial No. PCT/US2010/002954, Invitation to Pay Additional Fee mailed Feb. 22, 2011", 10 pgs.

(Continued)

*Primary Examiner* — William C Dowling
(74) *Attorney, Agent, or Firm* — Schwegman, Lundberg & Woessner, P.A.

(57) ABSTRACT

A projection device embodiment comprises a light source system, a gate with a cross sectional gate area, and projection optics. The light source system includes a solid-state light source configured to provide light, and light source optics. The light source optics are configured to distribute light from the solid-state light source across the gate area of the gate. The gate is configured to be used to produce an object to be imaged by the projection device. The projection optics is configured to project an image of the object.

19 Claims, 7 Drawing Sheets

(56) References Cited

U.S. PATENT DOCUMENTS

| | | |
|---|---|---|
| 2006/0001842 A1* | 1/2006 | Engle .............................. 353/94 |
| 2006/0114423 A1* | 6/2006 | Maeda et al. ................... 353/94 |
| 2006/0221305 A1 | 10/2006 | Magarill |
| 2008/0231953 A1 | 9/2008 | Young |
| 2009/0213281 A1 | 8/2009 | Young |
| 2010/0309665 A1 | 12/2010 | Young et al. |
| 2013/0100639 A1* | 4/2013 | Li et al. ........................... 362/84 |

FOREIGN PATENT DOCUMENTS

| | | |
|---|---|---|
| WO | WO-2006088735 A2 | 8/2006 |
| WO | WO-2007040540 A1 | 4/2007 |
| WO | WO2011/059493 A1 | 5/2011 |

OTHER PUBLICATIONS

"International Application No. PCT/US2010/002954, Search Report mailed Apr. 27, 2011", 6 pgs.

"International Application No. PCT/US2010/002954, Written Opinion mailed Apr. 27, 2011", 13 pgs.

"Source Four: Assembly Guide", Production Dates: Sep. 2004-Aug. 2007, 32 pgs.

Welford, W T, et al., "The Optics of Nonimaging Concentrators: Light and Solar Energy", New York: Academic Press, (1978), 47-88 and 171-176.

"European Application Serial No. 10787591.6, Response filed Dec. 30, 2012 to Communication mailed Jun. 20, 2012", 4 pgs.

"International Application Serial No. PCT/US2010/002954, International Preliminary Report on Patentability", 14 pgs.

\* cited by examiner

PROJECTION DEVICE FOR ARCHITECTURAL AND ENTERTAINMENT LIGHTING

CLAIM OF PRIORITY

This application claims the benefit of priority to U.S. Provisional Application No. 61/261,069, filed Nov. 13, 2009, the disclosure of which is incorporated herein by reference in its entirety.

TECHNICAL FIELD

This application relates generally to illumination and display devices, and more particularly to projection devices for architectural and entertainment lighting.

BACKGROUND

Some known projection devices for architectural and entertainment lighting use incandescent light sources and an ellipsoid reflector to direct light toward a gate (an optical plane for the device) to be imaged by a projection lens. The incandescent light sources are energy inefficient, have short life spans, and emit unwanted wavelengths (infrared). These known projection devices use mechanical apparatuses at the gate to adjust the light passing through the gate. An example of such a mechanical device is a laser-cut disc placed at the gate to provide a desired shape or outline image to the projected light. Another example is an adjustable, mechanical shutter that slides into the light path at the gate to "cut" the projected light.

SUMMARY

A projection device embodiment comprises a light source system, a gate with a cross sectional gate area, and projection optics. The light source system includes a solid-state light source configured to provide light, and light source optics. The light source optics is configured to distribute light from the solid-state light source across the gate area of the gate. The gate is configured to be used to produce an object to be imaged by the projection device. The projection optics are configured to project an image of the object.

A projection device embodiment comprises at least one light emitting diode (LED), a gate, an optical system, a digital device positioned at the gate, and a control system. The optical system is configured to produce a distribution of light from the at least one LED at the gate, and the control system is connected to the LED to control the light generated by the LED and connected to the digital device to control the light passed through the gate.

According to a method of operating a projection device having a light source system with a solid-state light source, light source optics, and a gate with a gate area, light is produced using the at least one solid-state light source, and the light is distributed across the gate area of the gate using the light source optics. Distributing the light includes reflecting the light produced by the at least one solid-state light source using reflective optics selected from the group consisting of: reflective optics with straight walls, a truncated shape and overall dimensions of a compound parabolic concentrator; and compound parabolic concentrator reflective optics. The gate is sued to produce an object, and the object is projected from the projection device.

According to a method of operating a projection device, light is produced using at least one light emitting diode (LED). The light is distributed to a gate, and a digital device is used to control light passed through the gate.

This Summary is an overview of some of the teachings of the present application and not intended to be an exclusive or exhaustive treatment of the present subject matter. Further details about the present subject matter are found in this application. Other aspects will be apparent to persons skilled in the art upon reading and understanding this application and viewing the drawings that form a part thereof, each of which are not to be taken in a limiting sense.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment.

Some characteristics of LEDs (light emitting diodes) include, but are not limited to, longevity, compact size, low voltage requirements, and low heat emissions. LEDs also have a narrow wavelength providing the ability to efficiently and consistently produce color light and mix light. However, this characteristic also creates difficulties that must be overcome to use LEDs for some devices, such projection devices for architectural and entertainment lighting. Such devices that use more than one LED should provide thorough mixing of the light from each of the LEDs. The desire for thorough mixing holds true even if the LEDs are of the same color, because of inherent variability in the manufacture of the LEDs. A plurality of different color LEDs, including white LEDs, can be mixed to allow the device to project light of different target colors or to project white light.

It is also desirable to provide efficient systems. Etendue characterizes how spread out the light is in area and angle. A perfect optical system produces an image with the same etendue as the source. It is desirable to create an efficient system that produces the image with a low etendue to use most of the light that is generated by the LEDs.

Figure 1:
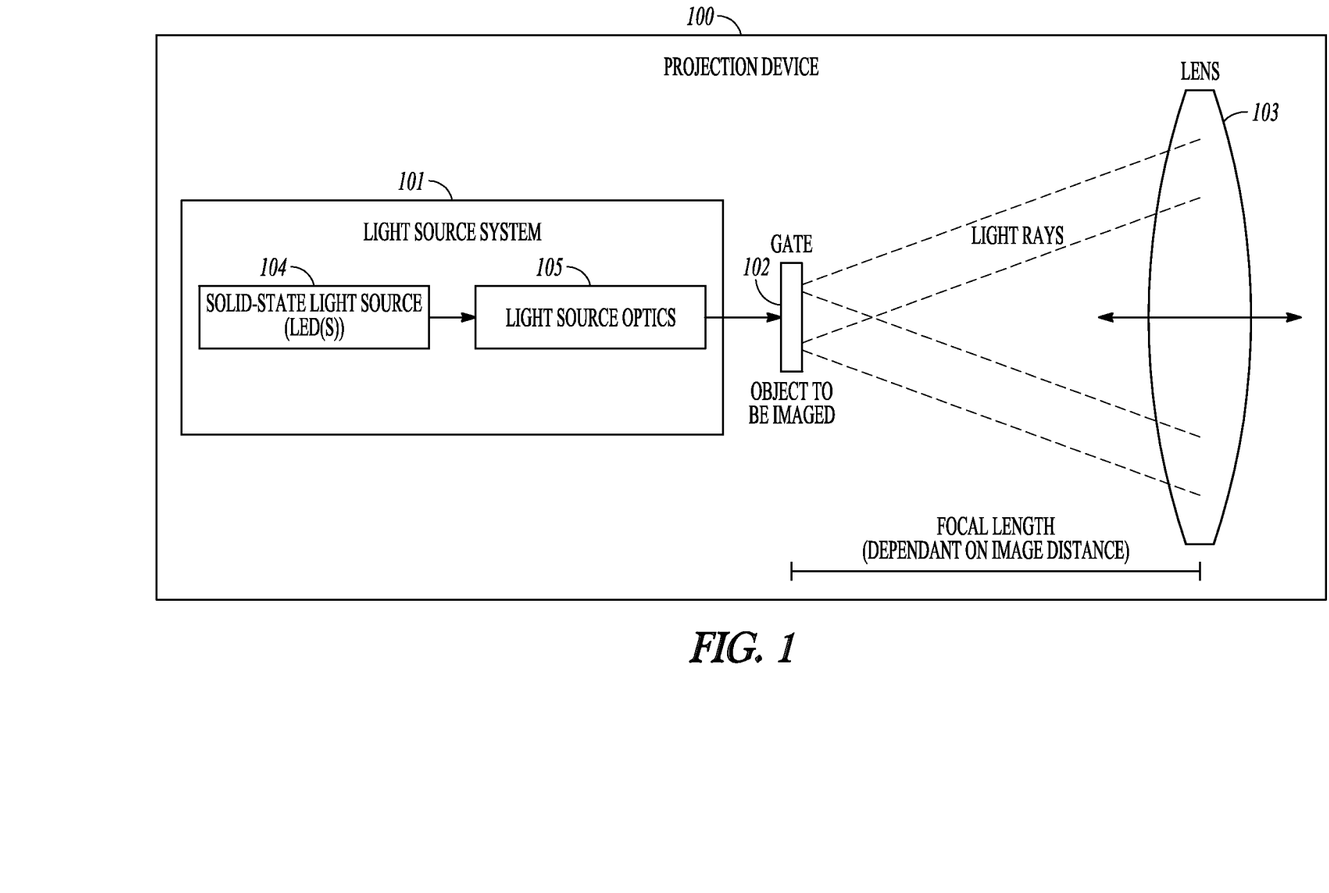
FIG. 1 illustrates an embodiment of a projection device.

FIG. 1 illustrates an embodiment of a projection device. The illustrated projection device 100 includes a light source system 101, a gate 102, and a projection optics illustrated as a lens 103. The illustrated light source system 101 includes a solid-state light source 104, such as may include one or more LEDs configured to produce a light, and light source optics 105. In some embodiments, a control system, such as may be included in the light source or as a separate element in the projection device, controls the one or more LEDs. In some embodiments, the control system may also be connected to a digital device at the gate. For example, some embodiments individually control the illumination from LEDs to mix LED colors to form a target color. The light source optics 105 distributes the light produced by the light source 104 across a cross-sectional area (gate area) of the gate 102. As will be described in more detail below, various embodiments are configured to efficiently deliver a high intensity light across the gate area by maintaining a low etendue, various embodiments are configured to distribute a homogeneous intensity across the gate area, and various embodiments are configured to distribute homogeneous chromaticity across the gate area. The gate provides a plane where the object to be projected is provided. Some embodiments locate an outline image, printed image transparency, iris, baffle, or digital image display device at the gate. The projection optics (e.g. lens 103) has an object plane that coincides with the gate and projects the image of the object.

The distribution of luminance at the gate can be uniform, an axial cosine function, or dynamic based on the control of the light source. Uniform light distribution can be achieved using a reflective truncated shape with straight walls and overall dimensions (input, output, and height) of a compound parabolic concentrator (CPC) designed for the light source(s) area and desired angle of beam distribution. The reflective truncated shape optic homogenizes the light and narrows the angle while adequately conserving etendue.

Because of the straight-walled design of the described reflective truncated shape optic a reflective film like 3M's Vikuiti Enhanced Specular Reflector Film (ESR) can be placed over the walls of the reflector to achieve high reflectivity (greater than 98%). The straight walls make it possible to bend the ESR around a cone-shaped reflector with a circular output. A circular output may be desirable if the light source is a single LED encapsulated in a dome. Placing the encapsulation dome on LEDs increases extraction from the die and as a result increases the lumen output of the LED. Due to the index of refraction of the dome, the encapsulation also significantly increases the etendue of the LED. If a flat window package, like Luminous' PhlatLight SBT Series of LED Display Products, is used instead of a dome, it is possible to bring the reflector down to where it nearly touches the die and reduce the etendue. In this arrangement the reflector can have the same shape as the LED die, most likely a square, which can be tiled easily.

Figure 2:
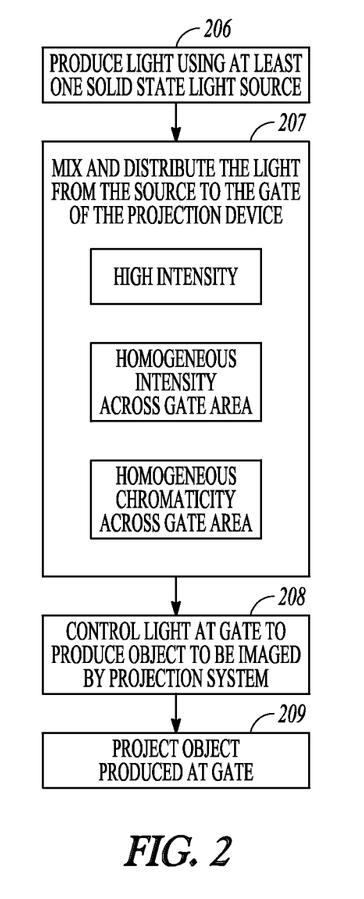
FIG. 2 illustrates an embodiment of a method for operating a projection device.

FIG. 2 illustrates an embodiment of a method for operating a projection device. As illustrated at 206, at least one solid-state light source (e.g. LED) is used to produce light. The solid-state light is mixed and distributed to the gate area of the projection device 207. The light can be mixed to provide a high intensity image at the gate, to provide homogeneous intensity across the gate area, and/or to provide homogeneous chromaticity across the gate area. At 208, the light is controlled at the gate to produce the object to be imaged by the projection system. The object produced at the gated is projected at 209.

Figure 3:
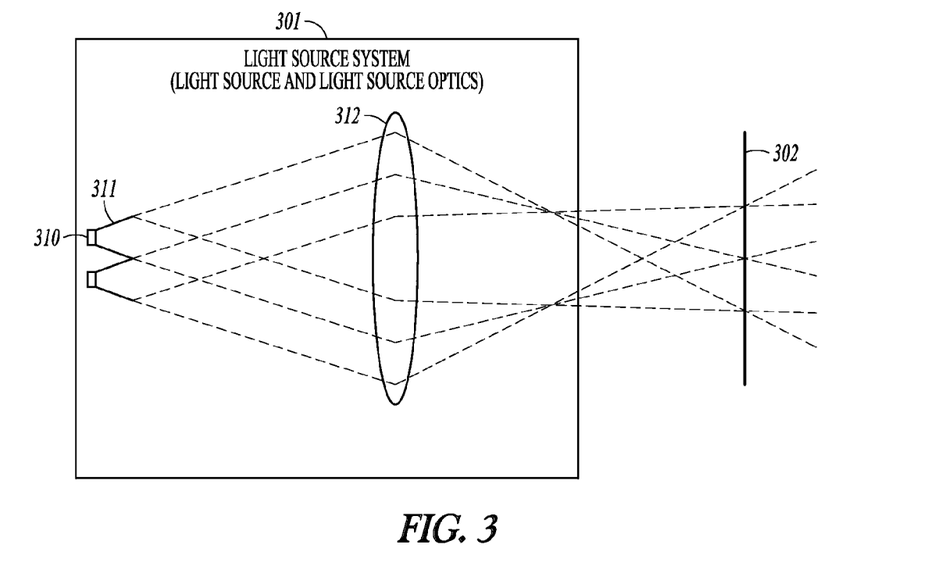
FIG. 3 illustrates an embodiment of a light source system used to produce and distribute light across a gate within a projection device, wherein the light source includes reflective optics with straight walls, a truncated shape and overall dimensions of a compound parabolic concentrator (CPC).

FIG. 3 illustrates an embodiment of a light source system 301 used to produce and distribute light across a gate 302 within a projection device, wherein the light source includes LEDs 310 and reflective optics 311 with straight walls, a truncated shape and overall dimensions of a compound parabolic concentrator (CPC). The illustrated system 301 also includes a lens 312 which, along with the reflective optics 311, functions as light source optics to distribute the light produced from the LEDs to the gate 302. A reflective truncated shape optic produces a uniform distribution of luminance across the output of each reflective truncated shape optic. Thus, it is possible to tile multiple outputs together. The output from these reflective truncated shape optics can be placed directly against the gate, or a lens can be used to reimage the output plane of the reflectors onto the gate. The illustrated system uses a lens 312 to reimage the light from reflective truncated shape optics 311 onto the gate 302. The position and focal length of the lens 312 can be selected to create a magnification factor such that the output size of the reflectors 311 is scaled to match the size of the gate 302. Additionally, the surface of the lens 312 may be frosted or a diffuser material may be placed between the gate 302 and the reflectors 311 to further homogenize the light. Using a high-efficiency, holographic diffusing element, like LSD Light Shaping Diffusers from Luminit, can reduce light loss. The lens 312 also transitions the diverging rays from the output of the reflector 311 to converging at the gate 302, which can improve image quality and reduce light loss.

When tiling multiple light sources 311, the individual light sources can be dimmed independently of each other to produce different intensities at the gate 302. This independent control may be used to maintain uniformity across the gate 302, or it may be used to create images by using the tiled sources 311 as pixels at the gate 302.

Figure 4:
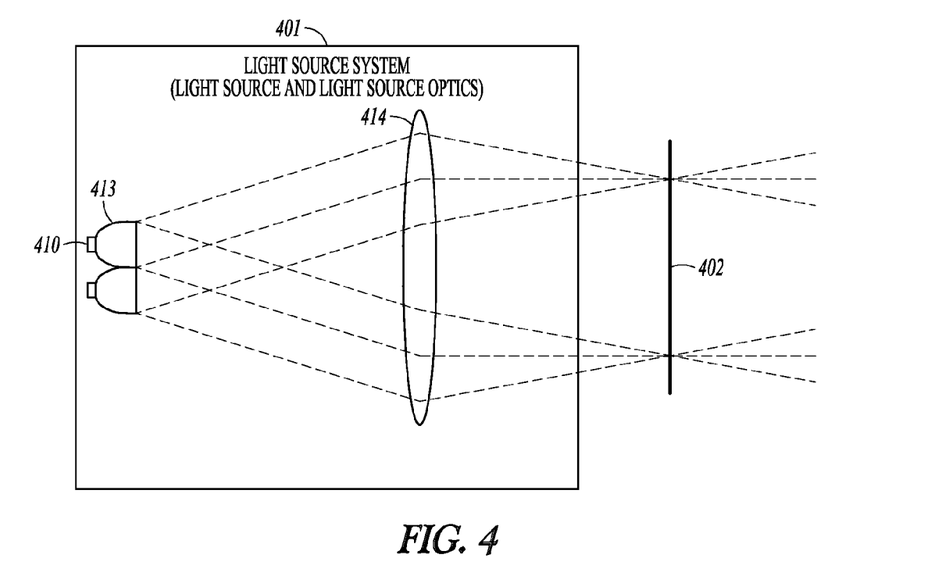
FIG. 4 illustrates an embodiment of a light source system used to produce and distribute light across a gate within a projection device, wherein the light source includes CPC reflective optics with walls that follow a parabolic profile.

FIG. 4 illustrates an embodiment of a light source system 401 used to produce and distribute light across a gate 402 within a projection device, wherein the light source includes LEDs 410 and CPC reflective optics 413 with walls that follow a parabolic profile. The illustrated system 401 also includes a lens 414 which, along with the CPC reflective optics 413, functions as light source optics to distribute the light produced from the LEDs to the gate 402. CPC reflective optics do not produce the same uniform distribution of luminance at their outputs as straight-walled reflective truncated shape optics. However, CPC reflective optics produce a uniform angular distribution. The lens 414 is placed such that the gate 402 is at the focal point of the lens 414 to convert the uniform angular distribution from the CPC reflective optics 413 into a uniform luminance distribution at the gate 402. By placing the lens such that the 410 is at the other focal point of the lens 414, the optics conserve etendue as it reconverges the light toward the gate 402. The source 410 can be placed closer to the lens 414 to shorten the optical system, but the angular distribution at the gate will expand thus increasing etendue. The lens 414 may be frosted or a diffuser material may be used to further homogenize the light.

The CPC reflector optic more efficiently conserves etendue than a straight-walled reflective truncated shape optic. The non-imaging lens arrangement used in the CPC reflector optical system more efficiently conserves etendue as well. The output from each light source contributes to the entire luminance distribution at the gate, so that sources of different brightnesses are mixed and still produce uniformity at the gate. This is desirable with LED sources because of the inherent variability of LEDs. Also this efficient mixing system can be used to homogenize different color of light without any dichroics by using different colors for some sources 410. This allows for colors with overlapping spectrums to be mixed (e.g. deep-red, red, orange, amber, green, cyan, blue, deep-blue, warm-white, neutral-white, cool-white could all be mixed). Colors with overlapping spectrums cannot be mixed with dichroics.

Because of the way in which the angular distribution is converted to a luminance distribution, the shape of the angular distribution also determines the shape of the luminance distribution. If CPC with square outputs are used, a square will be produced at the gate. If the gate is a circle instead of a square, a CPC with a circular output of the same diameter can be used without any additional lost light, even though the light from the corners of the LED die will not be collected. Using a circular output may allow for the reflectors to be more tightly arranged, to reduce etendue.

The CPC reflector requires curved walls unlike the straight-walled truncated shape optic. When using a square output, each of the four walls only curves along one axis, which allows for a reflective material like ESR to be laid onto the surfaces. When using a circular output the walls must be curved in two axes, making it challenging to lay a reflective film like ESR. The walls can still be coated with thin film reflective coatings or metallization using vapor deposition processes. Instead a hexagonal output can be used which provides a similar packing density to circular outputs while still providing walls with only one axis of curvature.

An alternative to using air-filled CPC reflectors is to use a material with a higher index of refraction like glass, acrylic, or polycarbonate. Total internal reflection (TIR) can be used instead of a reflective material. The light will be widened as it exits the CPC such that the CPC needs to be shaped to produce to a narrower angle than with an air-filled CPC, so that the output in air is the same angle. Additionally, the light entering the CPC will be narrowed as it enters the CPC such that CPC needs to be shaped as an angle-to-angle concentrator as described by (Welford, W T, and Roland Winston. The Optics of Nonimaging Concentrators: Light and Solar Energy. New York: Academic Press, 1978. Print.).

Figure 5:
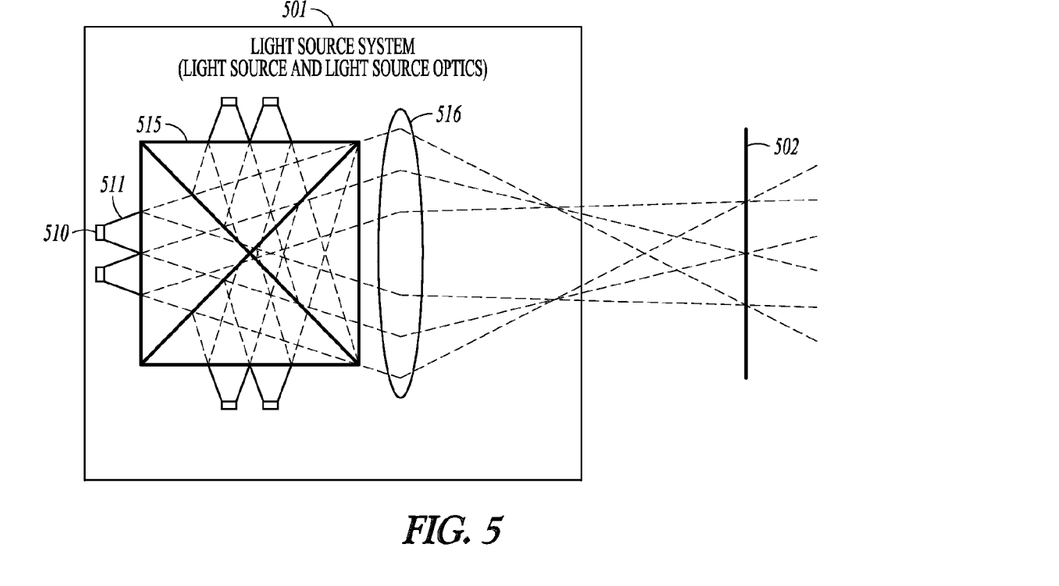
FIG. 5 illustrates an embodiment of a light source system used to produce and distribute light across a gate within a projection device, wherein the light source includes reflective optics with straight walls, a truncated shape and overall dimensions of a CPC, and further includes a dichroic filter assembly.

FIG. 5 illustrates an embodiment of a light source system 501 used to produce and distribute light across a gate 502 within a projection device, wherein the light source includes LEDs 510, reflective optics 511 with straight walls, a truncated shape and overall dimensions of a CPC, and further includes a dichroic filter assembly 515. The illustrated system includes a lens 516 which, along with the reflective optics 511, functions as light source optics to distribute the light produced from the LEDs to the gate 502. Dichroic filters selectively pass light of a small range of colors while reflecting other colors. The illustrated dichroic filter assembly 515 is a dichroic cube with straight-walled reflective truncated shape optics 511, being reimaged by a lens 516 at the gate 502. The dichroic cube allows for multiple colors of sources to be overlaid in the same etendue. In this arrangement the individual light sources 510 can be dimmed independently of each other to not only produce different intensities at the gate 2502 but also different chromaticity. This independent control allows both color uniformity and intensity uniformity to be maintained across the gate 502. Independent control of the sources 510 may also be used to create full color images by using the tiled sources 510 as colored pixels.

Figure 6:
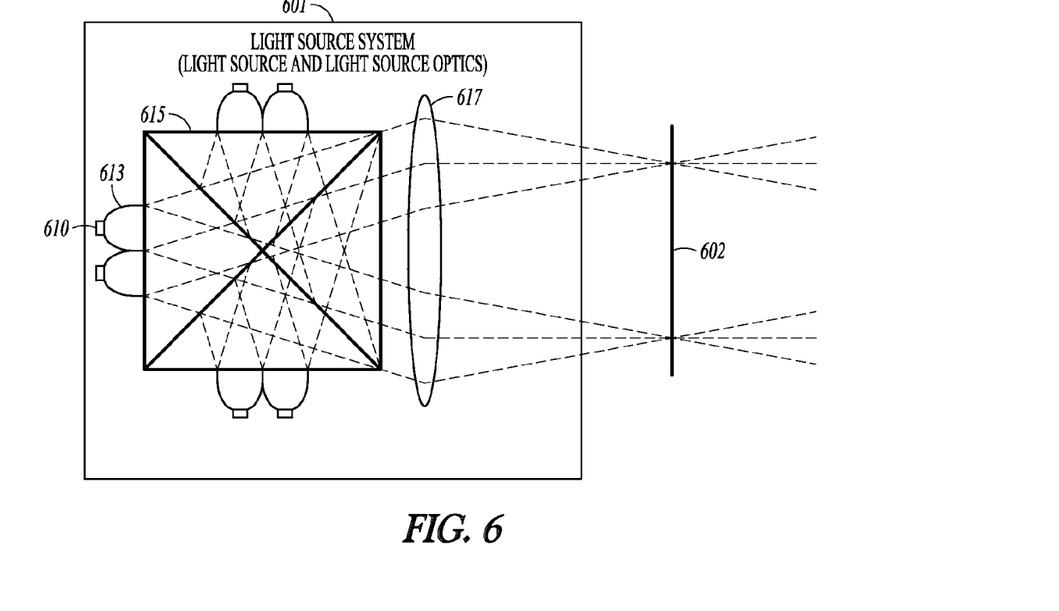
FIG. 6 illustrates an embodiment of a light source system used to produce and distribute light across a gate within a projection device, wherein the light source includes CPC reflective optics with walls that follow a parabolic profile, and further includes a dichroic filter assembly.

FIG. 6 illustrates an embodiment of a light source system 601 used to produce and distribute light across a gate 602 within a projection device, wherein the light source includes LEDs 610, CPC reflective optics 613 with walls that follow a parabolic profile, and further includes a dichroic filter assembly 615. The illustrated system includes a lens 617 which, along with the CPC reflective optics 613, functions as light source optics to distribute the light produced from the LEDs to the gate 602.

Using uniform angular distribution to produce uniformity at the gate with dichroics can cause a lateral color shift. All of the light that passes through the dichroics at any particular angle will be reconverged to a single point on the gate. Dichroics filter wavelength changes with angle. Thus, light that passes through the dichroic at one angle may be filtered differently than light that passed through at another angle, which means that light at one point may produce a different color than light at another point. This is especially a problem if the spectrums of the sources are very close to the filter wavelength of the dichroics. The lateral color shift can be reduced by choosing sources such that their spectrums are far away from the filter wavelengths of the dichroics, or by filtering the sources so that all of the light near the filter wavelengths of the dichroics is removed. Also multiple dichroic cubes can be used and overlapped so that light from one dichroic cube has the opposite lateral color shift as the other dichroic cube. Multiple dichroic cubes with different filter arrangements further reduces the effect of lateral color shift.

Figure 7:
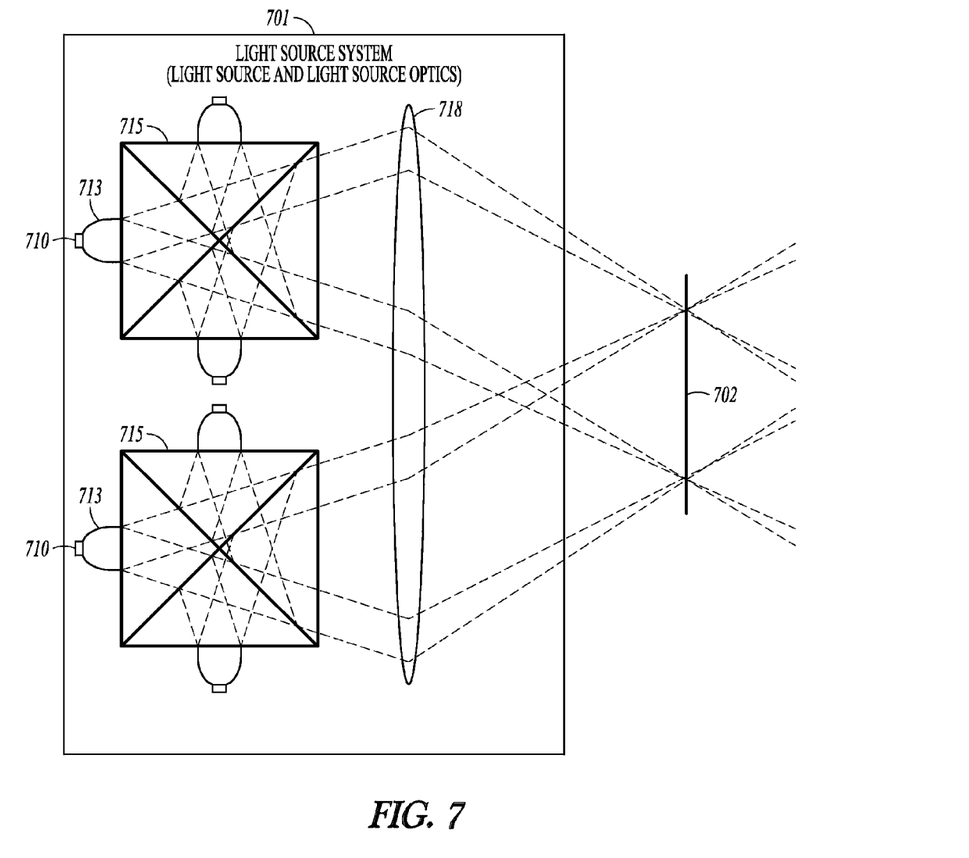
FIG. 7 illustrates an embodiment of a light source system used to produce and distribute light across a gate within a projection device, wherein the light source includes two or more dichroic filter assemblies to mix a plurality of light emitting diodes (LEDs).

FIG. 7 illustrates an embodiment of a light source system 701 used to produce and distribute light across a gate 702 within a projection device, wherein the light source includes two or more dichroic filter assemblies 715 to mix a plurality of light emitting diodes (LEDs) 710. The illustrated system 701 includes CPC reflective optics 713, and a lens which, along with the CPC reflective optics 713, functions as light source optics to distribute the light produced from the LEDs to the gate 702.

Figure 8:
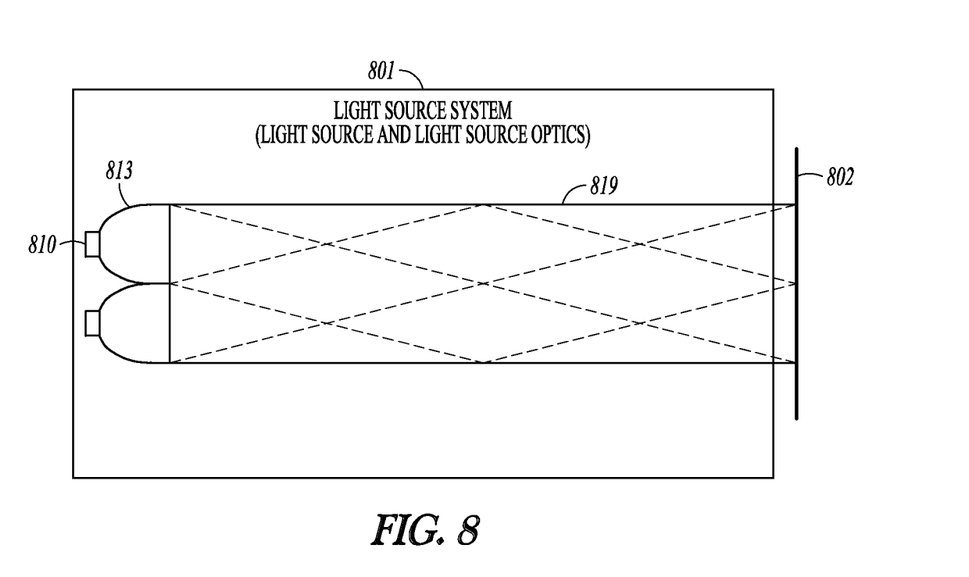
FIG. 8 illustrates a light source system that includes CPC reflective optics with walls that follow a parabolic profile, and further includes a mixing tunnel.

FIG. 8 illustrates a light source system 801 that includes LEDs, 810, CPC reflective optics 813 with walls that follow a parabolic profile, and further includes a mixing tunnel 819. The mixing tunnel 819, along with the CPC reflective optics 813, functions as light source optics to distribute the light produced form the LEDs to the gate 802. The mixing tunnel 819 mixes the light and contains the light as it is delivered to the gate 802. The illustrated mixing tunnel is used instead of a lens. The mixing tunnel allows the uniform angular distribution to expand until the luminance distribution becomes more uniform. If the output of the CPC reflective optics 813 are square, the uniform angular distribution is square. The mixing tunnel also has a square cross-section. Allowing the light to expand until its diameter in free air would be twice that of the diameter of the tunnel provides uniform luminance since all areas of the tunnel will contain light that has overlapped four times. If this mixing is still not sufficient the tunnel can be lengthened to the distance where the diameter of the light expanding in free air would have been some larger integer multiple of the tunnel diameter. This distance can be approximated using simple trigonometry as: $k \cdot r_{tunnel}/\tan(\theta_{1/2})$, where $\theta_{1/2}$ is the half angle of the light leaving the reflector, $r_{tunnel}$ is the approximate radius of the tunnel, and k is an integer multiple greater than one. Using a mixing tunnel in this manner takes advantage of the uniform angular distribution and mixes the light in a relatively short distance, compared to a tradition mixing tunnel that requires several bounces to randomize the distribution.

Figure 9:
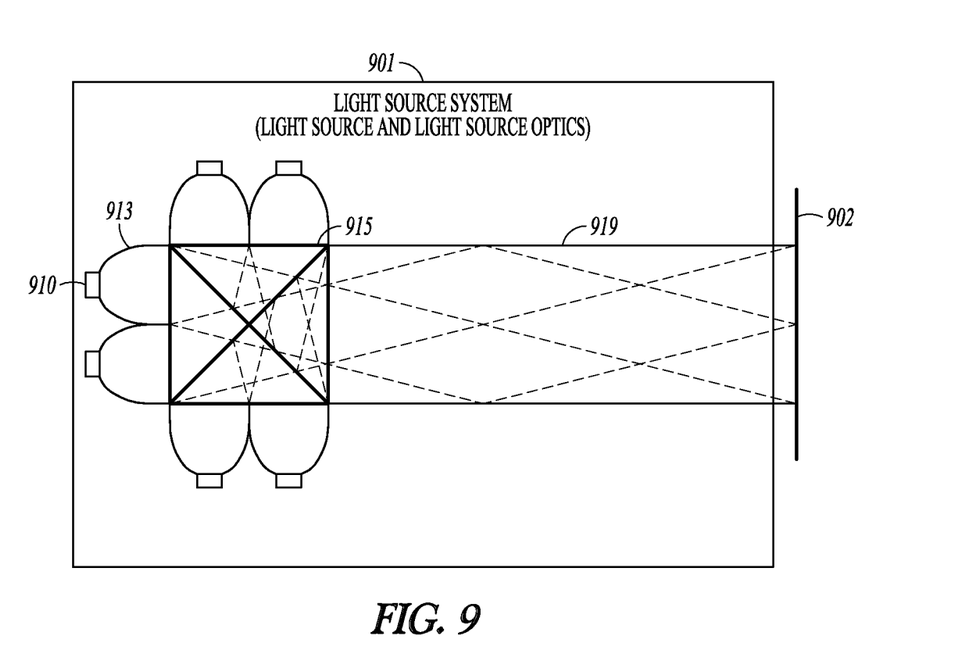
FIG. 9 illustrates a light source system that includes CPC reflective optics with walls that follow a parabolic profile, a dichroic filter assembly, and a mixing tunnel.

FIG. 9 illustrates a light source system 901 that includes LEDs 910, CPC reflective optics 913 with walls that follow a parabolic profile, a dichroic filter assembly 915, and a mixing tunnel 919. The mixing tunnel 919, along with the CPC reflective optics 913 and the dichroic filter assembly 915, functions as light source optics to distribute the light produced form the LEDs to the gate 902. The mixing tunnel shown in is also less susceptible to lateral color shift than the lens system shown in FIG. 6. The same system can be used if the output of the CPC reflective optics, the uniform angular distribution, and the cross section of the mixing tunnel have the same shape (e.g. a circle instead of a square). The dichroic cube can be used as part of the tunnel if the dichroic cube is made of a solid material such as glass, acrylic or polycarbonate with a higher index of refraction than air. The sides of the dichroic cube need to be optically polished so that the reflections on the sides are formed by total internal refraction (TIR). Since the light through the dichroic cube is narrowed by the high index of refraction of the cube, the light does not expand as rapidly. In order to allow the light to expand to the same size, the distance spent in the higher index of refraction material should be divided by that index of refraction, to produce the equivalent distance in air. The distance of the tunnel after adding the equivalent distance from the dichroic cube needs to equal to the intended tunnel distance.

Figure 10:
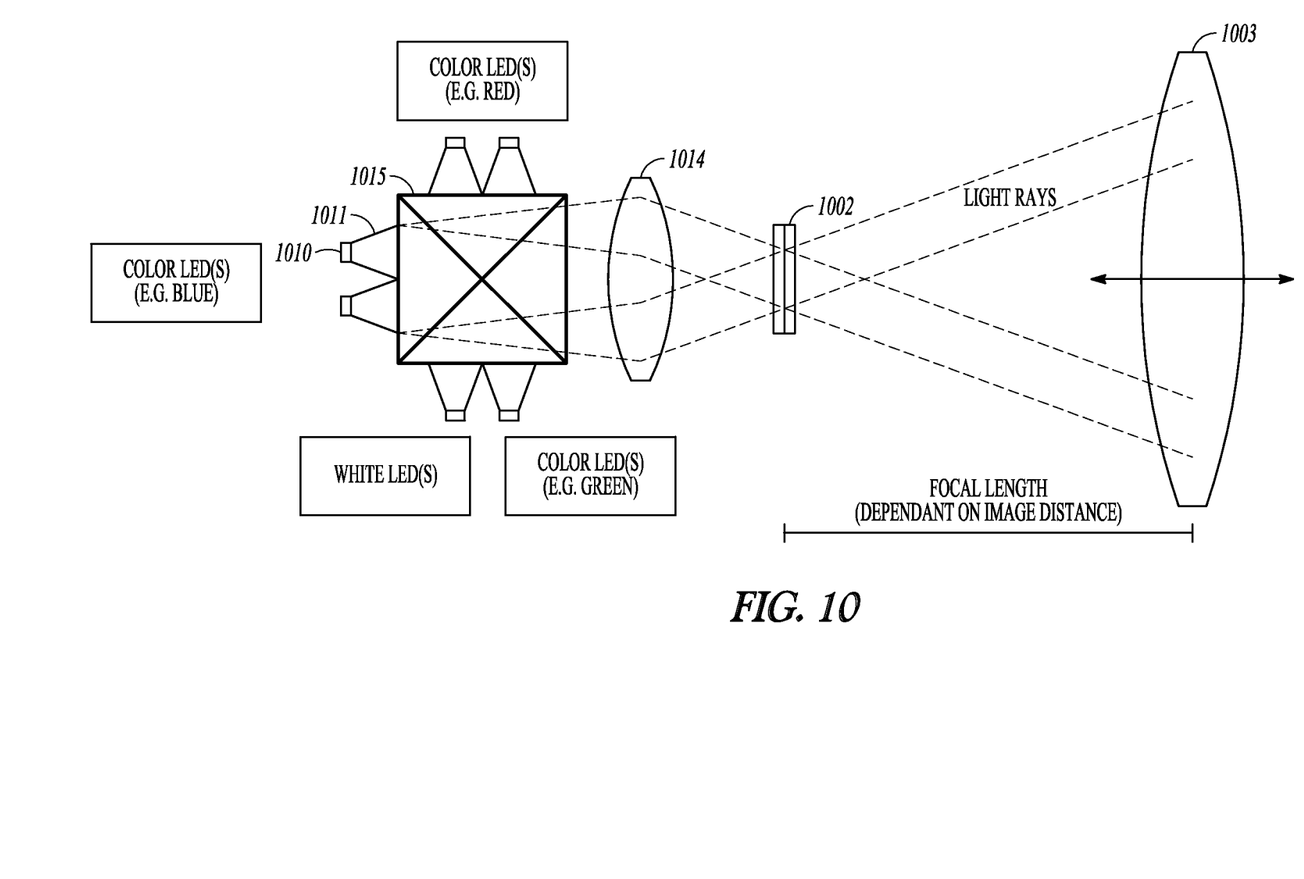
FIG. 10 illustrates an embodiment of a projection device, wherein the light source includes reflective optics with straight walls, a truncated shape and overall dimensions of a CPC, and further includes a dichroic filter assembly.

FIG. 10 illustrates an embodiment of a projection device, wherein the light source system includes LEDs 1010, reflective optics 1011 with straight walls, a truncated shape and overall dimensions of a CPC, and further includes a dichroic filter assembly 1015. The illustrated system also includes a lens 1014 which, along with the reflective optics 1011, functions as light source optics to distribute the light produced from the LEDs to the gate 1002. The gate 1002 is used to provide an object that is projected by the lens.

The combined spectral distribution of the light source(s) can be modified using color mixing methods (such as the color mixing discussed in U.S. patent application Ser. No. 11/557,861, filed on Nov. 8, 2006 and entitled "Apparatus, Methods, and Systems for Multi-Primary Display or Projection" which is hereby incorporated by reference in its entirety). The color mixing can be controlled directly or indirectly by the user. The combination of separate wavelengths can be achieved using dichroic filters (such as discussed in U.S. Published Application 20080231953 filed Nov. 16, 2007 and entitled "System and Method for LED Polarization Recycling" which is hereby incorporated by reference in its entirety), optical cavity with diffuse and/or specular reflective walls (such as described in U.S. patent application Ser. No. 12/794,384, filed on Jun. 4, 2010 and entitled "Optical System For Theatrical and Stage Lighting" which is hereby incorporated by reference in its entirety), or closely packaged light source components (for example the LZ4-00MC10 available from LEDEngin, Inc. located in Santa Clara, Calif.).

Significant complications arise when combining more than three primaries using dichroic filters due the need for large slope transitions from reflective to transmissive with respect to wavelength because the spectral distributions of many solid-state light sources are close or overlap. One solution is to use blue pumped YAG phosphor converted white LEDs in combination at the same entrance as green in order to fill the gap between green and red in a typical RGB system. The complexity of the dichroic coating does not increase significantly and the light lost, deep blue and red, contribute a small percentage of the total lumens emitted (<30%) of the white LED.

White LEDs are more flexible in a color mixing system when filtered (i.e. removing blue light), regardless of combination method, because the hue emitted by the phosphors has a higher saturation. However, the luminous flux contribution typically remains higher than a natively monochromatic LED with the same dominant wavelength. The higher saturation or color purity widens the gamut and provides another monochromatic primary, as opposed to a polychromatic source with a blue component that has a significant "chromatic pull" (defined as m=Y'/y). As a general example, consider a system that needed to produce both high and low correlated color temperature (CCT) white light includes a high CCT white LED source. Although the high CCT white LED source provides several positive attributes, such as high efficiency and broad green-yellow spectral content, the source is underutilized because of the presence of the pump wavelength, which is detrimental in the low CCT range. If the white LED source was filtered at least to exclude the pump wavelength then the high efficiency green-yellow light could be utilized over a larger range.

The indirect method of light source color control relates mainly to the addition of a digital image display device in that the combined color output of the light source(s) is synchronized with the image data communicated to the display. For example, a monochromatic grayscale display device that modulates pixel intensity can receive data sequentially based on a single color (primary) component of the target image. The same primary color is produced by the combined output of the light source(s) and simultaneously illuminates the single color image, which is separated temporally from subsequent illuminated single color images. If the sequential illuminated images are cycled rapidly, then the human eye integrates the individual images into a single full color image. Similarly, the intensity of the light source(s) can be synchronized with the display image in order to improve contrast (such as described in US Patent Publication No. 20090213281 filed Feb. 20, 2009 and entitled "System and Method For Improved Contrast Ratio in a Projection System" which is hereby incorporated by reference in its entirety) (Scene Adaptive Contrast Control—SACC™).

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A projection device, comprising:
 a light source system, wherein the light source system includes:
  a solid-state light source configured to provide light, wherein the solid state light source includes light emitting diodes (LEDs) and the LEDs include a white LED configured to produce a white light and further include color LEDs configured to produce colors of light including a red LED configured to produce red light, a green LED configured to produce green light, a blue LED configured to produce blue light; and light source optics configured to mix light from the LEDs where in the light source optics include a dichroic filter configured to pass one of the colors of light and reflect the other colors of light, wherein the dichroic filter includes light entrances, where the white light and at least one of the colors of light enter a same entrance of the dichroic filter; and a gate having a cross sectional gate area, wherein the light source optics are configured to distribute light from the solid-state light source across the gate area of the gate, wherein the gate is configured to be used to produce an object to be imaged by the projection device; and projection optics configured to project an image of the object.

2. The projection device of claim 1, wherein the white LED includes a blue pumped YAG phosphor converted white LED.

3. The projection device of claim 1, wherein the light source includes a filter to remove blue light from white light produced by the white LED.

4. The projection device of claim 1, wherein the light source optics include:

reflective optics with straight walls, a truncated shape and overall dimensions of a compound parabolic concentrator; and a lens between the reflective optics and the gate.

5. The projection device of claim 1, wherein the light source optics include:

compound parabolic concentrator reflective optics; and a lens between the compound parabolic concentrator reflective optics and the gate.

6. The projection device of claim 1, wherein the light source includes at least two dichroic filters.

7. The projection device of claim 1, wherein the light source optics include a mixing tunnel between the light source and the gate.

8. The projection device of claim 1, wherein the gate includes an outline image, printed image transparency, iris, baffle, or digital image display device.

9. A projection device, comprising:

a white light emitting diode (LED) configured to produce a white light, a red LED configured to produce red light, a green LED configured to produce green light, and a blue LED configured to produce blue light;

light source optics configured to mix light from the LEDs where in the light source optics include a dichroic filter configured to pass one of the colors of light and reflect the other colors of light, wherein the dichroic filter includes light entrances, where the white light and at least one of the colors of light enter a same entrance of the dichroic filter;

a gate;

an optical system to produce a distribution of light from the LEDs at the gate;

a digital device positioned at the gate; and a control system connected to the LEDs to control the light generated by the LEDs and connected to the digital device to control the light passed through the gate.

10. The projection device of claim 9, wherein the optical system includes reflective optics with straight walls, a truncated shape and overall dimensions of a compound parabolic concentrator.

11. The projection device of claim 9, wherein the optical system includes compound parabolic concentrator reflective optics.

12. The projection device of claim 9, wherein the light source optics include a mixing tunnel.

13. A method of operating a projection device having a light source system with a solid-state light source, light source optics, and a gate with a gate area, comprising:

producing light using the at least one solid-state light source, including using a red light emitting diodes (LED) to produce a red light, a green LED to produce a green light, a blue LED to produce a blue light, and a white LED to produce a white light;

distributing the light across the gate area of the gate using the light source optics, wherein distributing the light includes reflecting the light produced by the LEDs using reflective optics selected from the group consisting of:

reflective optics with straight walls, a truncated shape and overall dimensions of a compound parabolic concentrator; and compound parabolic concentrator reflective optics;

wherein distributing the light further includes passing the light reflected from the reflective optics through light entrances to a dichroic filter, wherein passing the light includes passing the white light and at least one of the colors of light through a same entrance to the dichroic filter;

using the gate to produce an object; and projecting the object from the projection device.

14. The method of claim 13, wherein distributing the light further comprises passing the light reflected from the reflective optics through a mixing tunnel positioned between the reflective optics and the gate.

15. The method of claim 13, wherein producing light includes independently controlling each of a plurality of light emitting diodes (LEDs).

16. A method of operating a projection device, comprising:

producing light using light emitting diodes (LEDs), including using a red light emitting diodes (LED) to produce a red light, a green LED to produce a green light, a blue LED to produce a blue light, and a white LED to produce a white light;

distributing the light to a gate, wherein distributing the light includes passing the light through light entrances to a dichroic filter, wherein passing the light includes passing the white light and at least one of the colors of light through a same entrance to the dichroic filter; and using a digital device to control light passed through the gate.

17. The method of claim 16, further comprising using the digital device to shape or cut the light.

18. The method of claim 16, further comprising using the digital device to control color of the light.

19. The method of claim 16, further comprising rapidly cycling through illuminated single color images, wherein the cycling is sufficiently rapid to allow the human eye to integrate the images into a full color image.

* * * * *